(12) United States Patent
Cheng (10) Patent No.: US 9,797,604 B2
(45) Date of Patent: Oct. 24, 2017

(54) TUBE FASTENING STRUCTURE (71) Applicant: Taiwan Paiho Limited, Chang Hwa Hsien (TW)

(72) Inventor: Allen Cheng, Chang Hwa Hsien (TW)

(73) Assignee: TAIWAN PAIHO LIMITED, Chang Hwa Hsien (TW)

( * ) Notice: Subject to any disclaimer, the term of this patent is extended or adjusted under 35 U.S.C. 154(b) by 0 days.

(21) Appl. No.: 15/018,895

(22) Filed: Feb. 9, 2016

(65) Prior Publication Data

US 2017/0167734 A1 Jun. 15, 2017

(30) Foreign Application Priority Data

Dec. 10, 2015 (TW) .............................. 104141440 A (51) Int. Cl.
*F24D 3/14* (2006.01)
*F16L 3/10* (2006.01)
(Continued)

(52) U.S. Cl.
CPC ................ *F24D 3/143* (2013.01); *F16B 1/00* (2013.01); *F16L 3/1058* (2013.01); *F16L 3/137* (2013.01); *F16B 2001/0028* (2013.01)

(58) Field of Classification Search
CPC .......... A61M 25/02; A61M 2025/0253; A61M 2025/026; F24D 3/143; F24D 3/14;
(Continued)

(56) References Cited

U.S. PATENT DOCUMENTS 3,288,136 A * 11/1966 Lund .................... A61M 25/02
128/207.18
4,074,397 A * 2/1978 Rosin .................... A61M 25/02
128/DIG. 15
(Continued)

FOREIGN PATENT DOCUMENTS

CN 202942520 U 5/2013
DE 29716856 U1 12/1997
(Continued)

OTHER PUBLICATIONS

Office Action dated May 23, 2016 in corresponding Taiwanese application (Search Report included), English translation provided, 10 pages total.
(Continued)

*Primary Examiner* — Nkeisha Smith
(74) *Attorney, Agent, or Firm* — Bacon & Thomas, PLLC (57) ABSTRACT

The present invention relates to a tube fastening structure for fastening a tube in a radiant floor heating system, the tube fastening structure comprising a bottom layer and at least one fastening element. The bottom layer is fixed on ground and has a surface of loop members. The fastening element has a plurality of hook members on a first surface thereof, and the plurality of hook members are configured to be mechanically fastened to the surface of the loop members of the bottom layer. After the tube is placed on the bottom layer, the fastening element is configured to fasten the tube in a manner of surrounding the tube by a mechanical fastening between the plurality of hook members and the surface of the loop members of the bottom layer.

6 Claims, 8 Drawing Sheets

(51) Int. Cl.
*F16L 3/137* (2006.01)
*F16B 1/00* (2006.01)

(58) Field of Classification Search
CPC .. F24D 3/141; F24D 3/142; F16B 1/00; F16B 2001/0028; F16L 3/1058; F16L 3/137
USPC ..... 248/74.3, 74.4, 67.5; 206/363, 478, 438; 604/174, 180, 304
See application file for complete search history.

(56) References Cited

U.S. PATENT DOCUMENTS

| | | | | |
|---|---|---|---|---|
| 4,484,914 A * | 11/1984 | Brown | ................. | A61M 25/02 128/DIG. 26 |
| 4,617,017 A * | 10/1986 | Hubbard | ............... | A61M 25/02 128/DIG. 26 |
| 5,292,312 A * | 3/1994 | Delk | .................... | A61M 25/02 128/DIG. 26 |
| 5,300,037 A * | 4/1994 | Delk | .................... | A61M 25/02 128/DIG. 26 |
| 5,520,656 A * | 5/1996 | Byrd | ..................... | A61M 25/02 604/174 |
| 5,797,884 A * | 8/1998 | Byrd | ..................... | A61M 25/02 604/174 |
| 6,382,569 B1 * | 5/2002 | Schattner | .................. | F16L 3/04 248/220.41 |
| 7,624,480 B2 * | 12/2009 | Coronel | ................ | A61M 25/02 128/DIG. 15 |
| 7,793,892 B1 * | 9/2010 | Bowen | .................. | A61M 39/08 128/DIG. 26 |
| 2005/0137496 A1 * | 6/2005 | Walsh | ................... | A61M 25/02 600/561 |
| 2008/0108947 A1 * | 5/2008 | Crawford | .............. | A61M 25/02 604/174 |
| 2014/0027584 A1 | 1/2014 | Pauchet et al. | | |
| 2014/0074036 A1 * | 3/2014 | Cheng | .................. | A61M 25/02 604/179 |
| 2016/0114134 A1 * | 4/2016 | Yi | ....................... | A61F 13/0269 604/180 |

FOREIGN PATENT DOCUMENTS

| | | |
|---|---|---|
| DE | 29708455 U1 | 9/1998 |
| EP | 0346529 A1 | 12/1989 |
| TW | M309042 U | 4/2007 |

OTHER PUBLICATIONS

Patent Examination Report dated Sep. 5, 2016 in corresponding Australia application (Search Information Statement included), 8 pages total.
European Search Report dated May 10, 2017, for EP 16177976.4.

* cited by examiner

TUBE FASTENING STRUCTURE

BACKGROUND OF INVENTION

1. Field of Invention

The present invention relates to a tube fastening structure for fastening a tube in a radiant floor heating system, in particular to a tube fastening structure for fastening a tube by a coordination of a surface of loop members and hook members.

2. Related Prior Art

In order to make people have a more comfortable indoor environment, some buildings may have a radiant floor heating system buried in ground for conditioning a temperature of the ground. Such radiant floor heating system operates mainly by tubes disposed in the ground.

In the traditional radiant floor heating system, such as disclosed in U.S. Pat. No. 6,969,832B1, 7,145,112B1 or the like, in order to secure the tubes in the ground, it generally uses clips to fasten the tubes on a metal wire, laying the metal wire together with the tubes within a predetermined range on the ground, and performing grouting process to finish fastening of the tubes. However, if the tubes of the radiant floor heating system are secured by the above-mentioned method, since most of the tubes used in the radiant floor heating system are circulating (continuous) type loops, it needs lots of time to fasten such type of tubes and the metal wire for preventing the tubes from disconnecting during the mounting process. And, since before performing the grouting process, the metal wire together with the tubes fastened thereon are not completely secured on the ground, there still exists a risk of displacement of the tubes.

In the other traditional radiant floor heating system, it utilizes a method of remaining a channel for burying and securing tubes in ground in advance. Although such method can reduce a risk of displacement of the tubes during the securing process, yet the time necessary for constructing the ground is long and changeability for locations of the tubes is low.

Moreover, U.S. Pat. No. 8,316,893 had disclosed another structure for fastening tubes in ground. In this structure, the tube itself has a special design in which an outer surface of the tube is provided with a first fastening member which is engageable with a second fastening member of a bottom layer disposed on the ground. Thus, the tube can be secured in the ground by an engagement between the first fastening member on the outer surface of the tube and the second fastening member of the bottom layer disposed on the ground. In this regard, however, although such structure remains changeability for locations of the tubes, yet it is necessary to use the tubes having such special design, such that a cost for manufacturing the tubes is highly increased. And, if such structure is applied to the continuous type tubes in the radiant floor heating system, while changing locations of parts of the tubes, it needs lots attention for whether the remaining parts of the tubes are disconnected from each other due to the engagement with the bottom layer.

In view of above, since the traditional tube fastening structures and methods have the above-mentioned shortcomings, it motivates the inventor of the present invention to research and develop a new tube fastening structure for fastening a tube in a radiant floor heating system that is able to overcome every shortcomings of the above-mentioned existing tube fastening structures and methods effectively.

SUMMARY OF INVENTION

One object of the present invention is to provide a tube fastening structure for fastening a tube in a radiant floor heating system that can securely fasten the tube in the radiant floor heating system and has advantages of saving mounting time, low cost, high changeability and the like.

A tube fastening structure for fastening a tube in a radiant floor heating system in accordance with a first aspect of the present invention comprises a bottom layer and at least one fastening element. The bottom layer is fixed on ground and has a surface of loop members. The fastening element has a plurality of hook members on a first surface thereof, wherein the plurality of hook members are configured to be mechanically fastened to the surface of the loop members of the bottom layer. After the tube is placed on the bottom layer, the fastening element is configured to fasten the tube in a manner of surrounding the tube by a mechanical fastening between the plurality of hook members and the surface of the loop members of the bottom layer.

Preferably, the fastening element of the tube fastening structure in accordance with the first embodiment of the present invention includes a central section and two outer sections on two opposite sides of the central section. The central section is configured to surround on a part of an outer circumference surface of the tube, and the two outer sections are configured to be mechanically fastened to the surface of the loop members of the bottom layer by the plurality of hook members.

Preferably, the fastening element of the tube fastening structure in accordance with the first embodiment of the present invention further includes a second surface opposite to the first surface, and the second surface has loop members thereon. The fastening element includes a connecting body portion and two wing portions on two opposite sides of the connecting body portion. The connecting body portion is configured to be mechanically fastened to the surface of the loop members of the bottom layer by the plurality of hook members. The two wing portions are configured to surround on an outer circumference surface of the tube. Each of the two wing portions has a fixed end connected to the connecting body portion, and a free end detachable from the connecting body portion. The two free ends of the two wing portions are configured to be mechanically fastened to each other by the plurality of hook members on the first surface of the free end of one of the two wing portions and the loop members on the second surface of the free end of another wing portion of the two wing portion so as to fasten the tube. Moreover, the connection body portion and the two wing portions are formed integrally. Each of the two wing portions has a hollow part, and the connecting body portion has a central part and two extending parts in which the two extending parts extend outwardly from the central part into the hollow parts of the two wing portions, respectively.

A tube fastening structure for fastening a tube in a radiant floor heating system in accordance with a second aspect of the present invention comprises a bottom layer, a seat body and a fastening band. The bottom layer is fixed on ground and has a surface of loop members. A bottom surface of the seat body has a plurality of hook members which are configured to be mechanically fastened to the surface of the loop members of the bottom layer. The seat body has an opening through which the tube is received in the seat body. The fastening band has a first section and a second section on an outer surface thereof. The first section has a surface of loop members, and the second section has a plurality of hook members. A first end of the fastening band on a side of the first section is connected to a side of the seat body, and a second end of the fastening band on a side of the second section, in a state that the fastening band crosses the opening of the seat body, is configured to pass through a slit in the other side of the seat body and to be bended backwardly such that the plurality of hook members on the second section of the fastening band is mechanically fastened to the surface of the loop members on the first section of the fastening band.

Preferably, the seat body of the tube fastening structure in accordance with the second embodiment of the present invention has an inner arc surface which is configured to be mated with an outer circumference surface of the tube.

Preferably, the hook member used in the tube fastening structure in accordance with the first or second embodiment of the present invention is a hook which is bended toward a single direction.

Preferably, the hook member used in the tube fastening structure in accordance with the first or second embodiment of the present invention is a hook which is bended toward two different directions.

Further features and advantages of the present invention will be understood after reviewing the following detailed descriptions and the accompanying drawings of the invention.

DETAILED DESCRIPTION OF PREFERRED EMBODIMENT

Figure 1:
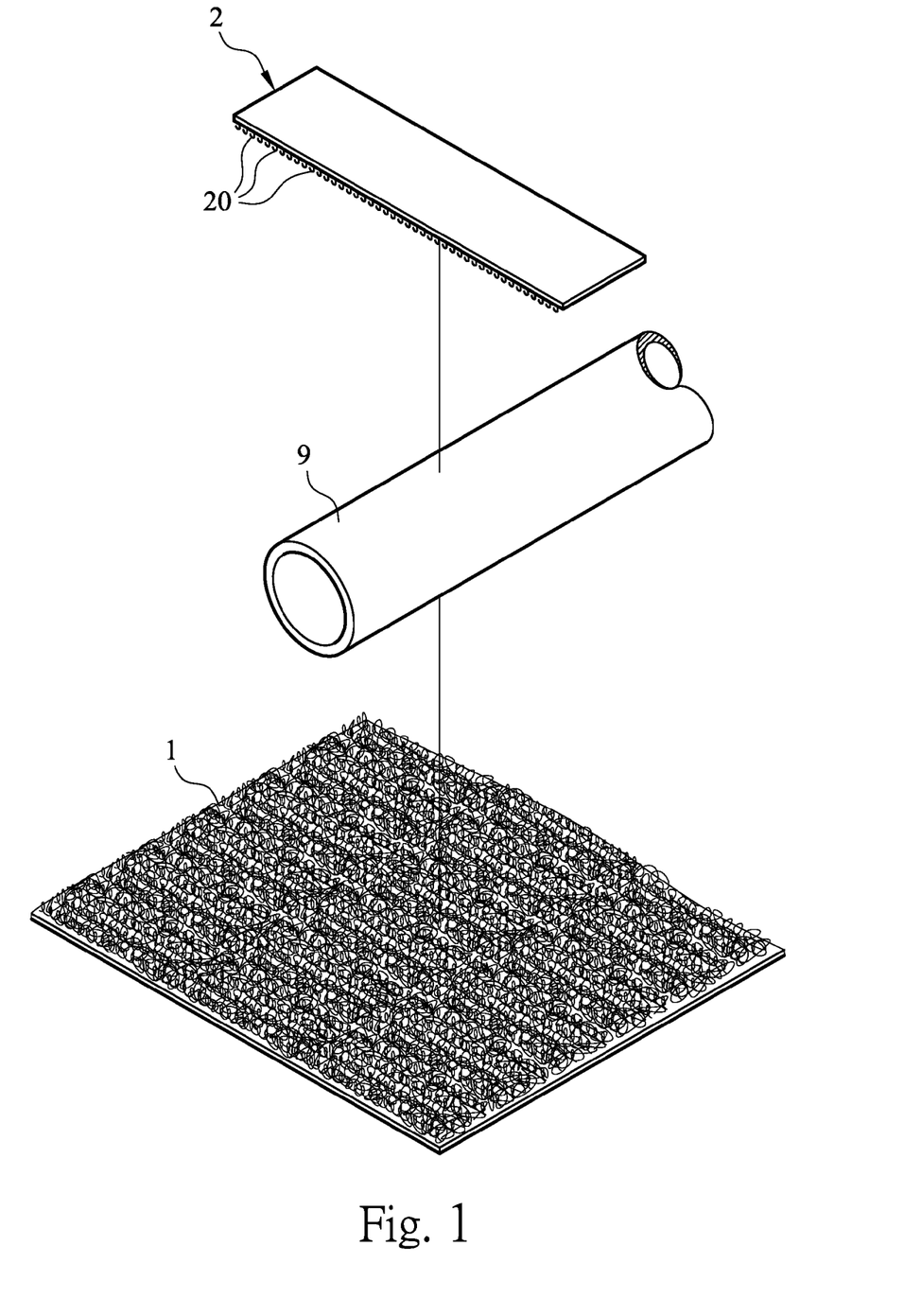
FIG. 1 is a schematic exploded perspective view of a tube fastening structure in accordance with a first embodiment of the present invention.
Figure 2:
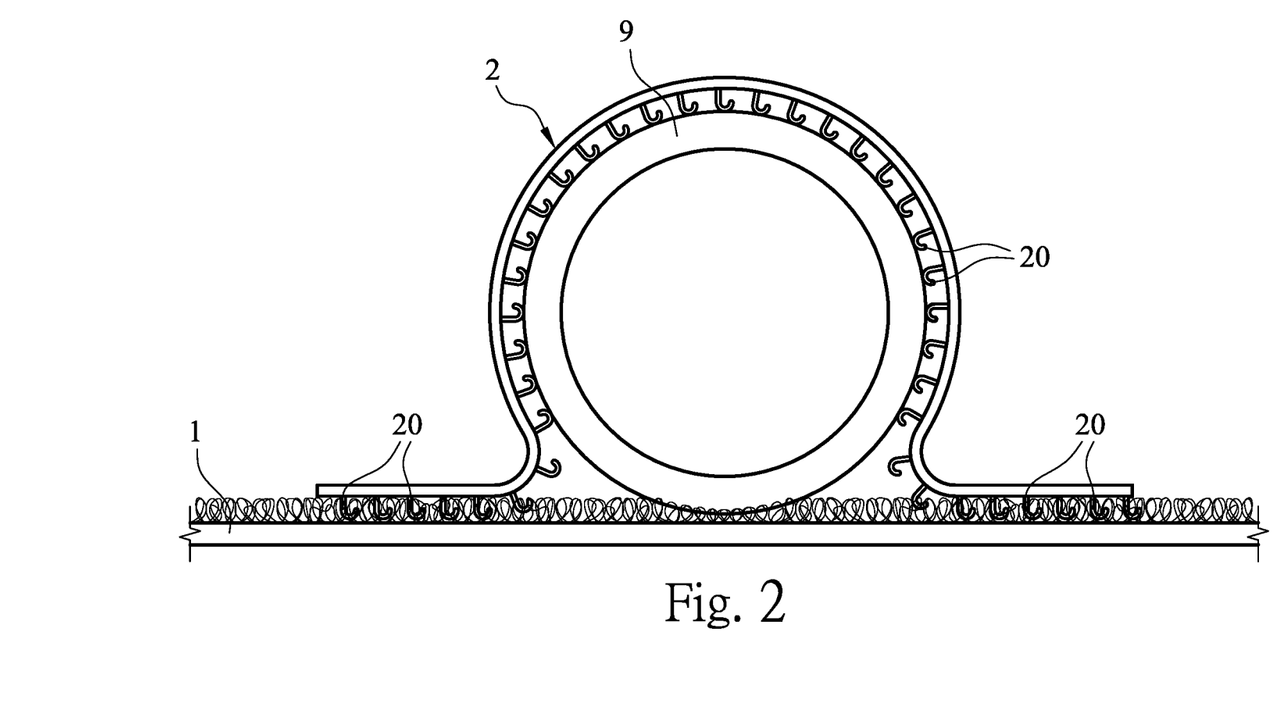
FIG. 2 is a schematic cross-sectional view illustrating a state after using the tube fastening structure in accordance with the first embodiment of the present invention to fasten a tube.
Figure 3:
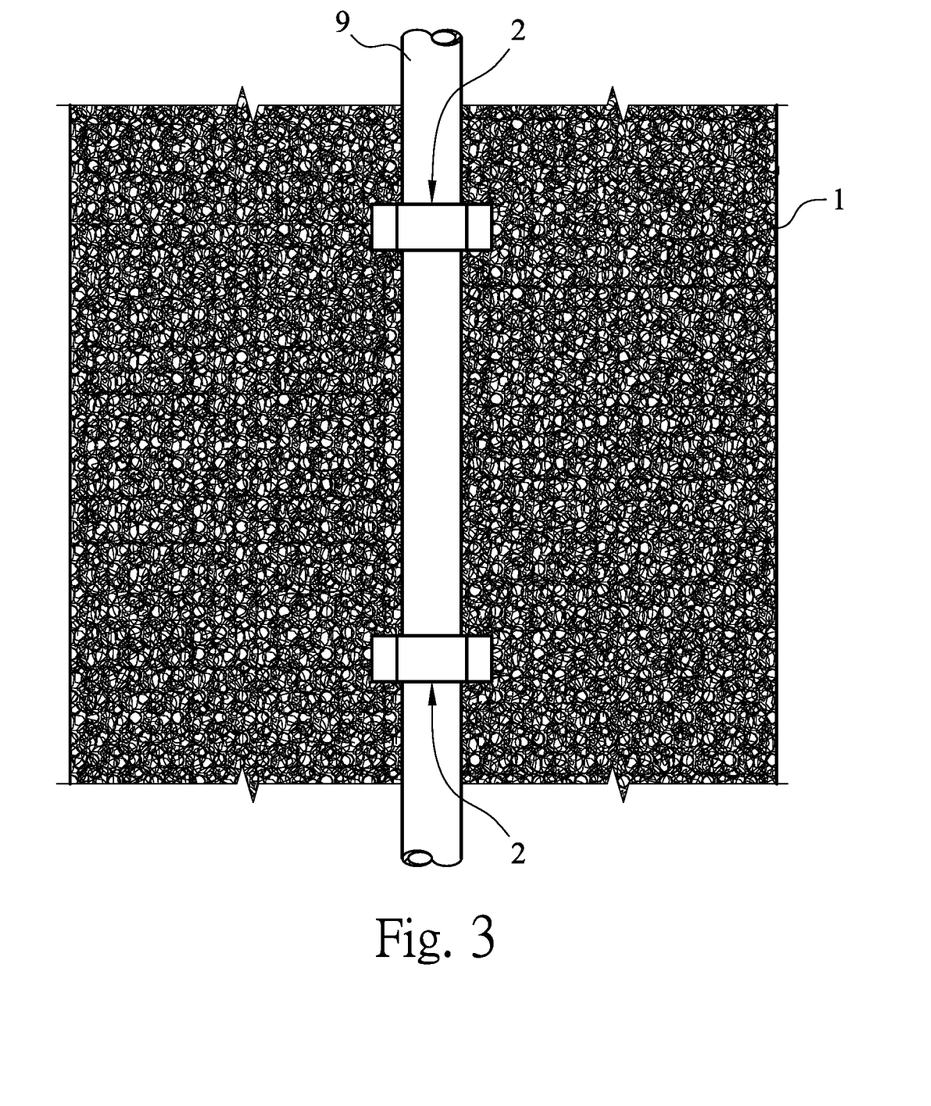
FIG. 3 is a schematic view showing that the tube is fixed by the tube fastening structure of the first embodiment of the present invention.

FIGS. 1 to 3 illustrate a tube fastening structure in accordance with a first embodiment of the present invention.

As shown in FIG. 1, the tube fastening structure in accordance with the first embodiment of the present invention includes a bottom layer 1 and a fastening element 2. The bottom layer 1 has a surface of loop members. The fastening element 2 is provided with a plurality of hook members 20 on a surface (a first surface) thereof; and the plurality of hook members 20 are configured to be mechanically fastened to the surface of the loop members of the bottom layer 1.

Next, a case of using the tube fastening structure in accordance with the first embodiment of the present invention to fasten a tube 9 in a radiant floor heating system will be described. At beginning, the bottom layer 1 is disposed (fixed) on ground within a predetermined range where the radiant floor heating system is to be disposed, and the tube 9 to be disposed is placed on the bottom layer 1. Then, securely fastening the tube 9 on the bottom layer 1 by using a central section of the fastening element 2 to surround and contact a part of an outer circumference surface of the tube 9, and making the plurality of hook members 20 provided on two outer sections of the fastening element 2, which are on two opposite sides of the central section, mechanically fasten to the surface of the loop members of the bottom layer 1, as shown in FIG. 2.

As shown in FIG. 3, the tube fastening structure in accordance with the first embodiment of the present invention can fasten the tube 9 at an arbitrary location on the bottom layer 1 by using one or more fastening elements 2. Note that although FIG. 3 illustrates using two fastening elements 2 to fasten the tube 9 at arbitrary locations on the bottom layer 1, yet the present invention is not limited thereto. For example, it is also possible to use only one fastening element 2 to fasten the tube 9, or to use more than two fastening elements to fasten the tube 9.

Accordingly, when compared to the tube fastening structure of the prior art, the tube fastening structure of the first embodiment of the present invention can make the tube in the radiant floor heating system be securely fastened on the ground or be detached from the ground through a simple operation by a coordination of the surface of the loop members and the hook members. And, the surface of the loop members and the hook members used in the tube fastening structure of the first embodiment of the present invention further have an advantage of low manufacturing cost. Furthermore, since the bottom layer of the present invention is disposed (fixed) on the ground within the predetermined range where the radiant floor heating system is to be disposed, and the tube is detachably fastened at the arbitrary location on the bottom layer 1 by the mechanical fastening between the hook members of the fastening element and the surface of the loop members of the bottom layer, the tube fastening structure of the first embodiment of the present invention has a higher changeability for location where the tube in the radiant floor heating system is disposed.

Figure 4:
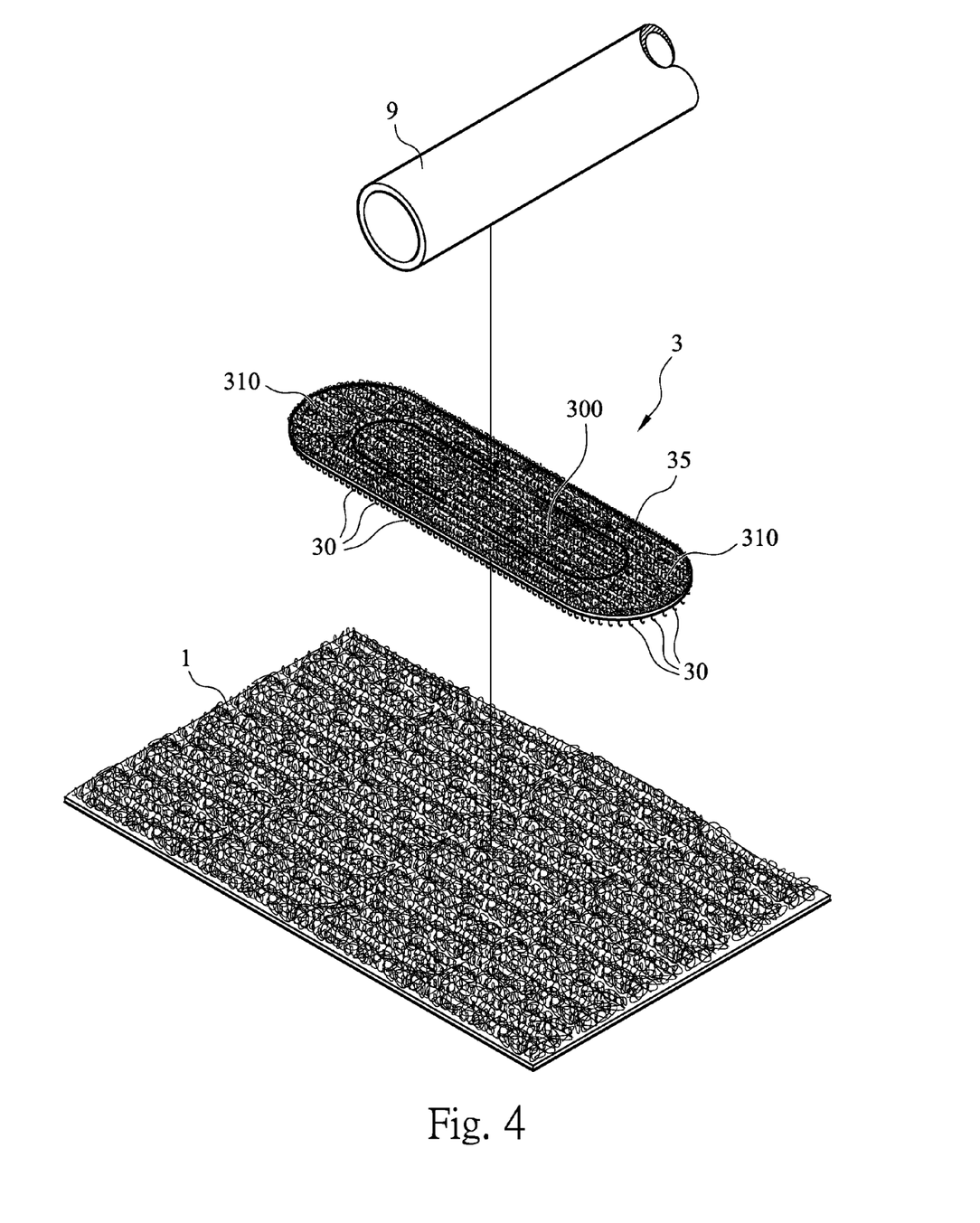
FIG. 4 is a schematic exploded perspective view of a tube fastening structure in accordance with a second embodiment of the present invention.
Figure 5:
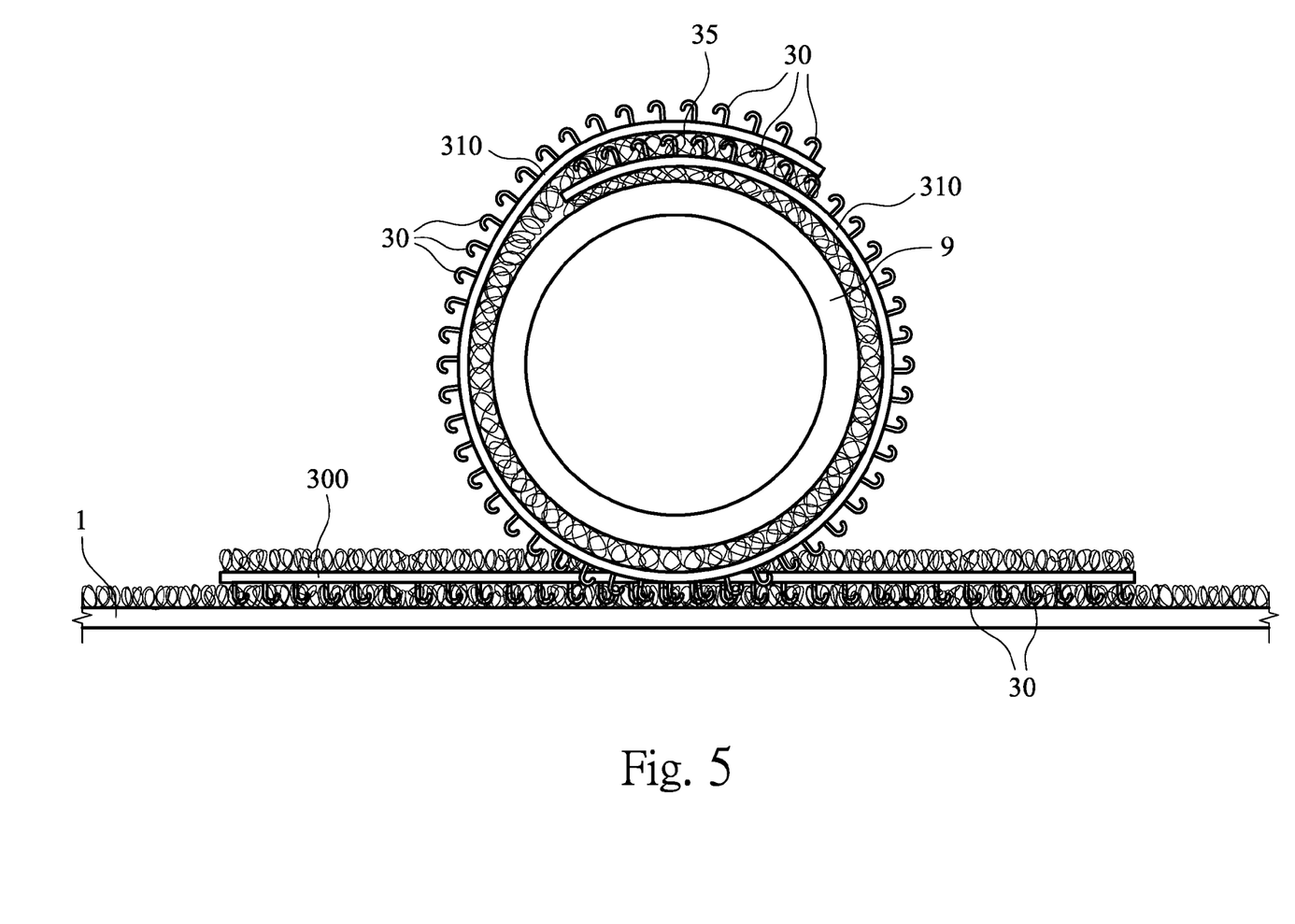
FIG. 5 is a schematic cross-sectional view illustrating a state after using the tube fastening structure in accordance with the second embodiment of the present invention to fasten a tube.
Figure 6:
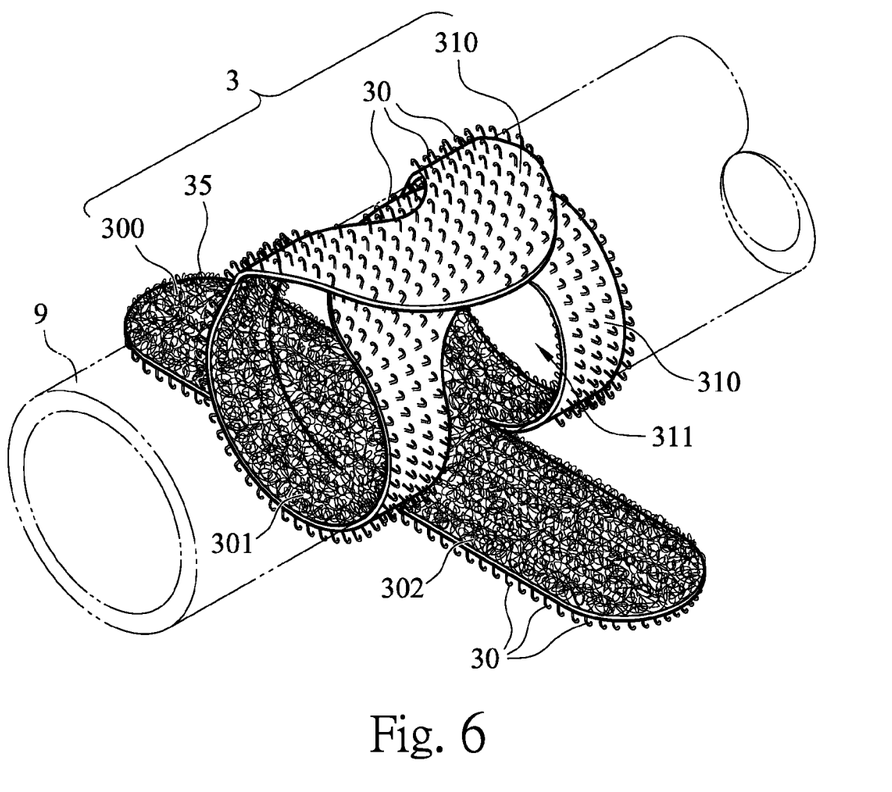
FIG. 6 is a schematic perspective view showing that a fastening element of the tube fastening structure of the second embodiment of the present invention surrounds on an outer circumference surface of the tube.

FIGS. 4 to 6 illustrate a tube fastening structure in accordance with a second embodiment of the present invention.

As shown in FIG. 4, the tube fastening structure in accordance with the second embodiment of the present invention includes a bottom layer 1 and a fastening element 3. The bottom layer 1 has a surface of loop members. A first surface of the fastening element 3 is provided with a plurality of hook members 30, and a second surface of the fastening element 3, which is opposite to the first surface, is provided with loop members 35. The fastening element 3 includes a connecting body portion 300 and two wing portions 310 respectively on two opposite sides of the connecting body portion 300. Each of the two wing portions 310 has a fixed end connected to the connecting body portion 300, and a free end detachable from the connecting body portion 300 (referring to FIGS. 4 and 6). Specifically, the connection body portion 300 and the two wing portions 310 of the fastening element 3 are formed integrally. And, as shown in FIGS. 4 and 6, the connecting body portion 300 has a central part 301 and two extending parts 302 respectively extending outwardly from the central part 301. The fixed ends of the two wing portions 310 are connected to the central part 301 of the connecting body portion 300, and the two wing portions 310 have hollow parts 311 corresponding to the extending parts 302 of the connecting body portion 300. In other words, the fastening element 3 in accordance with the second embodiment of the present invention is a sheet body which has two U-shaped cutting lines provided thereon, wherein the two U-shaped cutting lines are provided toward opposite directions, and openings of the two U-shaped cutting lines face to each other. Thus, the fastening element 3 can be divided into the connecting body portion 300 and the two wing portions 310 by the two U-shaped cutting lines.

Next, FIG. 5 is a schematic cross-sectional view illustrating a state after using the tube fastening structure in accordance with the second embodiment of the present invention to fasten the tube 9. The connecting body portion 300 is configured to be mechanically fastened to the surface of the loop members of the bottom layer 1 by the plurality of hook members 30. The two wing portions 310 are configured to surround on an outer circumference surface of the tube 9, and the two free ends of the two wing portions 310 are configured to be mechanically fastened to each other by the plurality of hook members 30 on the free end of one of the two wing portions 310 and the loop members 35 on the free end of another wing portion 310 so as to fasten the tube 9 on the bottom layer 1, as shown in FIG. 5.

Accordingly, when compared to the tube fastening structure of the prior art, in addition to the same advantages as to the tube fastening structure of the first embodiment of the present invention, since the fastening element of the tube fastening structure of the second embodiment of the present invention is used to surround the tube from lower side by the two wing portions so as to fasten the tube, the fastening element in the tube fastening structure of the second embodiment of the present invention has a better fixity than that of the first embodiment, whereby the tube is more securely fastened on the bottom layer.

Figure 7:
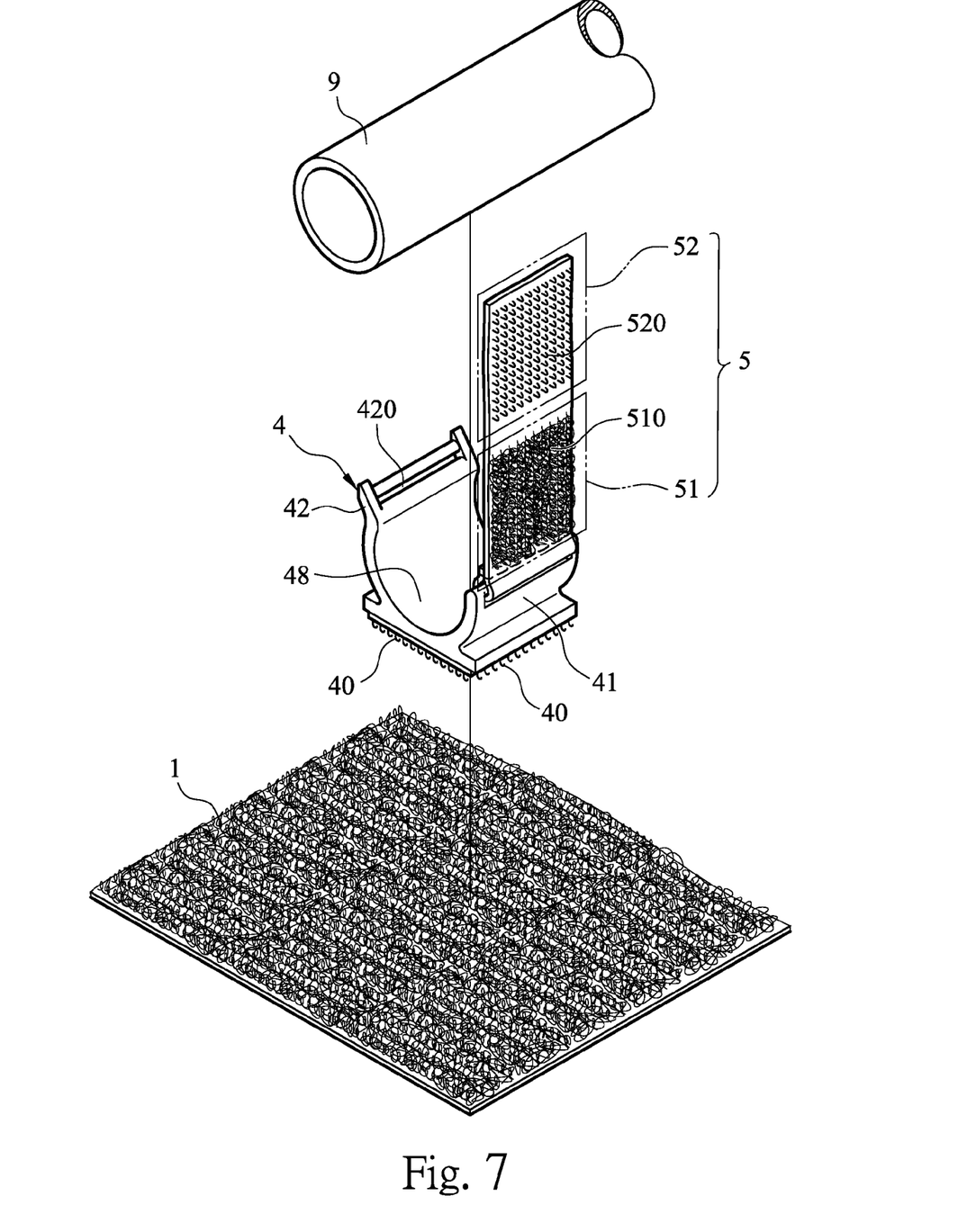
FIG. 7 is a schematic exploded perspective view of a tube fastening structure in accordance with a third embodiment of the present invention.
Figure 8:
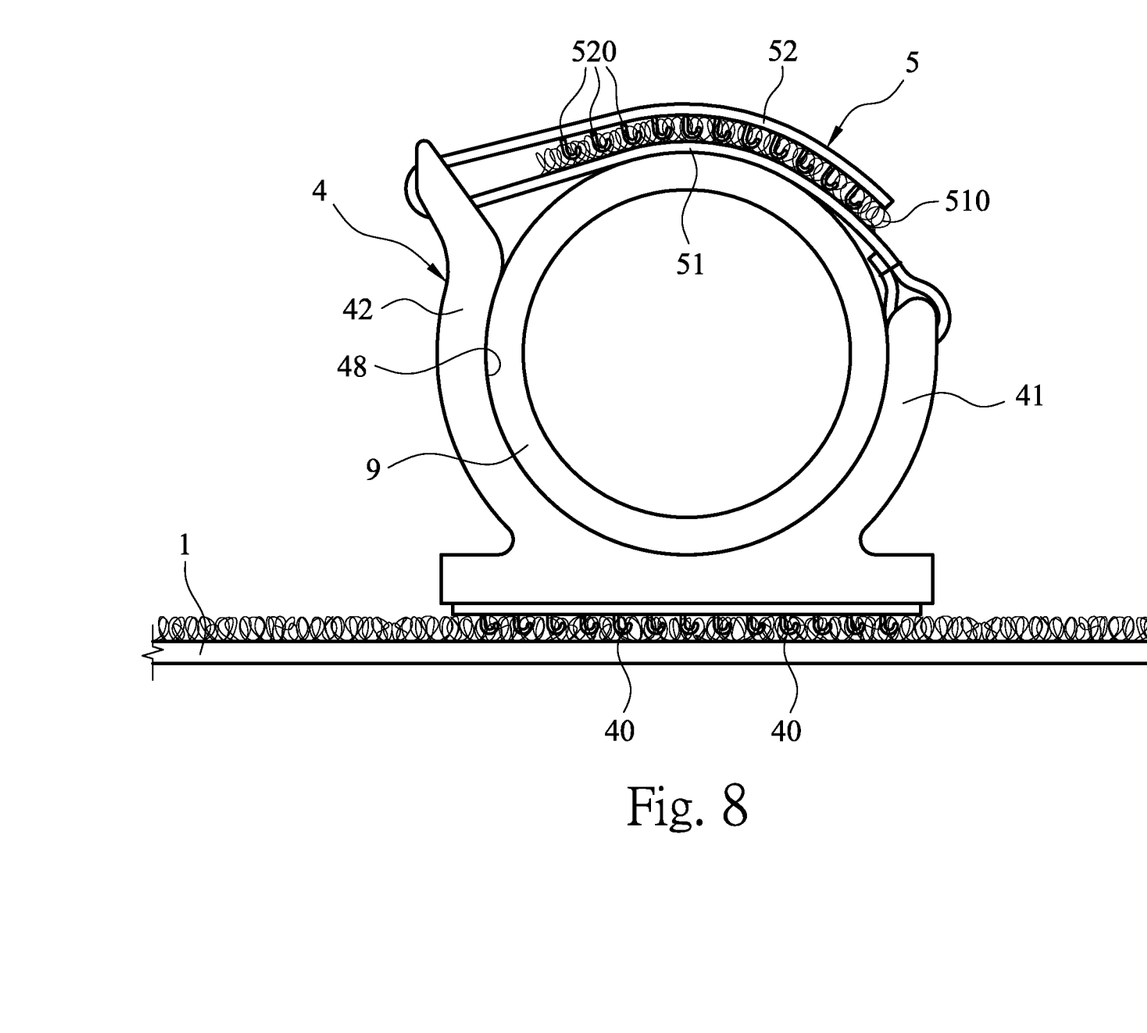
FIG. 8 is a schematic cross-sectional view illustrating a state after using the tube fastening structure in accordance with the third embodiment of the present invention to fasten a tube.

FIGS. 7 and 8 illustrate a tube fastening structure in accordance with a third embodiment of the present invention.

As shown in FIG. 7, the tube fastening structure in accordance with the third embodiment of the present invention includes a bottom layer 1, a seat body 4 and a fastening band 5. The bottom layer 1 is fixed on the ground and has a surface of loop members. A bottom surface of the seat body 4 has a plurality of hook members 40 which are configured to be mechanically fastened to the surface of the loop members of the bottom layer 1. The seat body 4 has an opening for passing through the tube 9 such that the tube 9 can be received on an inner arc surface 48 of the seat body 4 (referring to FIG. 8). The inner arc surface 48 is designed to be able to mate with an outer circumference surface of the tube 9 to be received thereon so as to achieve a better bearing effect. The fastening band 5 has a first section 51 and a second section 52 on an outer surface thereof in which the first section 51 has a surface of loop members 510, and the second section 52 has a plurality of hook members 520. A first end of the fastening band 5 on a side of the first section 51 is connected to a side 41 of the seat body 4 by a method such as a machine sewing method, an ultrasonic connecting method, a high frequency connecting method, and the like. A second end of the fastening band 5 on a side of the second section 52 can cross the opening of the seat body 4, pass through a slit 420 formed in the other side 42 of the seat body 4, and then be bended backwardly such that the plurality of hook members 520 on the second section 52 of the fastening band 5 can be mechanically fastened to the surface of the loop members 510 on the first section 51 (referring to FIG. 8).

FIG. 8 is a schematic cross-sectional view illustrating a state after using the tube fastening structure in accordance with the third embodiment of the present invention to fasten the tube 9. The tube 9 can be placed on the inner arc surface 48 of the seat body 4 before or after the hook members 40 of the seat body 4 is mechanically fastened to the surface of the loop members of the bottom layer 1. The fastening band 5 crosses above the tube 9 disposed in the seat body 4, then the second end of the fastening band 5 passes through the slit 420 (FIG. 7) of the seat body 4 and is bended backwardly, and the plurality of hook members 520 of the second section 52 of the fastening band 5 is mechanically fastened to the surface of the loop members 510 of the first section 51 of the fastening band 5 so as to securely fasten the tube 9 between the seat body 4 and the fastening band 5.

Accordingly, when compared to the tube fastening structure of the prior art, in addition to the same advantages as to the tube fastening structure of the first embodiment of the present invention, since the tube fastening structure of the third embodiment utilizes a cooperation of the seat body and the fastening band to fasten the tube between the seat body and the fastening band, the tube fastening structure of the third embodiment of the present invention has a better fixity than that of the first embodiment, whereby the tube is more securely fastened on the bottom layer. Moreover, by the tube fastening structure of the third embodiment of the present invention, when a user wants to change a location of the tube on the bottom layer, the user can easily detach the tube together with the seat body and the fastening band and move them to the other location on the bottom layer without separating the tube from the seat body and the fastening band, whereby a time necessary for detaching the fastening band can be reduced. Thus, the tube fastening structure of the third embodiment of the present invention can make the tube have a better changeability.

Please note that although in the accompanying drawings of the present invention, each of the hook members used in the first to third embodiments is shown as a hook which is bended toward a single direction, yet each of the hook members used in the first to third embodiments may also be a hook which is bended toward two different directions, or a hook having the other form as long as such hook can be mechanically fastened to the loop members.

Although the several aspects of the present invention have been described in the above-mentioned embodiments with reference to the accompanying drawings, such embodiments merely are the preferred embodiments of the present invention and are not intended to limit the scopes of the present invention in the specific features and structures as illustrated in the above-mentioned descriptions and the accompanying drawings. A person skilled in the art of the present invention can envisage various changes and modifications within the spirit of the present invention, and such changes and modifications are also included in the scopes of the present invention.

The invention claimed is:

1. A tube fastening structure for fastening a tube in a radiant floor heating system, the tube fastening structure comprising:
   a bottom layer fixed on ground, the bottom layer having a surface of loop members; and at least one fastening element having a plurality of hook members on a first surface thereof, and loop members on a second surface thereof that is opposite to the first surface, wherein the fastening element includes a connecting body portion and two wing portions on two opposite sides of the connecting body portion, the connecting body portion is configured to be mechanically fastened to the surface of the loop members of the bottom layer by the plurality of hook members, the two wing portions are configured to surround on an outer circumference surface of the tube; and wherein each of the two wing portions has a fixed end and a free end; wherein said two wing portions are symmetric about a central axis of the tube fastening structure, the fixed end is connected to the connecting body portion, the free end is detachable from the connecting body portion, the two free ends of the two wing portions are configured to be mechanically fastened to each other by the plurality of hook members on the first surface of the free end of one of the two wing portions and the loop members on the second surface of the free end of another wing portion of the two wing portions so as to fasten the tube.

2. The tube fastening structure of claim 1, wherein the connection body portion and the two wing portions are formed integrally.

3. The tube fastening structure of claim 2, wherein each of the two wing portions has a hollow part, and the connecting body portion has a central part and two extending parts, the two extending parts extend outwardly from the central part into the hollow parts of the two wing portions, respectively.

4. The tube fastening structure of claim 1, wherein the hook member is a hook which is bended toward a single direction.

5. The tube fastening structure of claim 1, wherein the hook member is a hook which is bended toward two different directions.

6. The tube fastening structure of claim 1, wherein said tube fastening structure is configured in a way such that the tube fastening structure is able to fasten a tube to a radiant floor heating system.

* * * * *